(12) United States Patent
Charlet et al.

(10) Patent No.: US 8,849,118 B2
(45) Date of Patent: Sep. 30, 2014

(54) METHOD FOR OPTIMIZING THE CAPACITY OF OPTICAL COMMUNICATION NETWORKS

(75) Inventors: Gabriel Charlet, Nozay (FR); Oriol Bertran-Pardo, Nozay (FR); Francesco Vacondio, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 107 days.

(21) Appl. No.: 13/580,269

(22) PCT Filed: Feb. 24, 2011

(86) PCT No.: PCT/EP2011/052762
§ 371 (c)(1),
(2), (4) Date: Sep. 20, 2012

(87) PCT Pub. No.: WO2011/113679
PCT Pub. Date: Sep. 22, 2011

(65) Prior Publication Data
US 2013/0022355 A1    Jan. 24, 2013

(30) Foreign Application Priority Data

Mar. 18, 2010    (FR) .................................. 10 01076

(51) Int. Cl.
*H04J 14/02*    (2006.01)

(52) U.S. Cl.
CPC ........... *H04J 14/0224* (2013.01); *H04J 14/026* (2013.01); *H04J 14/0257* (2013.01); *H04J 14/0208* (2013.01); *H04J 14/0217* (2013.01); *H04J 14/0213* (2013.01); *H04J 14/0212* (2013.01); *H04J 14/0204* (2013.01)
USPC .............................................. 398/69; 398/194

(58) Field of Classification Search
CPC ........................... H04J 14/0224; H04B 10/506
USPC ....................................... 398/69, 79, 182–201
See application file for complete search history.

(56) References Cited

U.S. PATENT DOCUMENTS

| 7,231,107 | B1 | 6/2007 | Zhong et al. |
| 7,783,197 | B2* | 8/2010 | Litvin et al. .................... 398/81 |
| 2009/0110033 | A1* | 4/2009 | Shattil ........................... 375/141 |

FOREIGN PATENT DOCUMENTS

EP    2134007    12/2009

* cited by examiner

*Primary Examiner* — Leslie Pascal
(74) *Attorney, Agent, or Firm* — Carmen Patti Law Group, LLC (57) ABSTRACT

The embodiments of the present invention describe a method for optimizing the capacity of an optical communication network that uses wavelength division multiplexing, wherein the spectral distribution of the signals intended to be transmitted over a plurality of channels is done dynamically through the use of a variable spectrum grid whose spectral spacings between two successive channels are determined based on the spectral width of said signals and in which dynamic filtering of said signals is carried out before their transmission in order to adjust their spectral width based on the available spectral space, and thereby reduce crosstalk between adjacent channels when the signals are transmitted.

13 Claims, 9 Drawing Sheets

METHOD FOR OPTIMIZING THE CAPACITY OF OPTICAL COMMUNICATION NETWORKS

TECHINCAL FIELD

The present invention relates to the field of optical communication networks, and more particularly the spectral distribution of channels within wavelength division multiplexing networks.

BACKGROUND

In existing networks, the spectral grids corresponding to the spectral distribution of these channels are grids comprising a fixed space of 50 or 100 GHz between channels as defined by the standards of the International Telecommunications Union. Such a standard spacing makes it possible to facilitate the detection of end signals, but leads to a waste of the available bandwidth. This is because the signals intended to be transmitted on these channels do not all have the same characteristics, such that the optical paths that they must take may have different characteristics. Thus, one means of optimizing the use of available spectral band is to propose a grid whose spacing between the channels is no longer uniform and fixed, but rather variable and adaptable to the characteristics of the signals and/or connections, thereby making it possible to reduce whenever necessary the spectral spacing in order to transmit a greater quantity of signals over the same spectral band. Nonetheless, the use of such a variable grid comprising reduced spectral spacings leads to increase in the crosstalk between adjacent channels during the transmission of the signals, leading to a reduction in the quality of the end signals.

The need is therefore to propose a method for reducing crosstalk between adjacent channels when a variable spectral grid is used whose spectral spacings may be reduced compared to standard spectral spacings.

SUMMARY

Thus, the present invention relates to a method for optimizing the capacity of an optical communication network that uses wavelength division multiplexing, wherein the spectral distribution of the signals intended to be transmitted over a plurality of channels is done dynamically through the use of a variable spectral grid whose spectral spacings between two successive channels are determined based on the spectral width of said signals and in which dynamic filtering of said signals is carried out before their transmission in order to adjust their spectral width based on the available spectral space, and thereby reduce crosstalk between adjacent channels when the signals are transmitted.

According to another aspect of the present invention, the determination of both the spectral spacings and the filtering applied to the signals is carried out with consideration for the inter-symbol interference introduced by said filtering.

According to an additional aspect of the present invention, the determination of both the spectral spacings and the filtering applied to the signals is carried out with consideration for the range desired for said signals.

According to another aspect of the present invention, the dynamic filtering of the signals is carried out within a wavelength-selective switch.

According to an additional aspect of the present invention, the signals intended to be transmitted are distributed into at least two groups, said at least two groups being sent to at least two distinct input ports of the wavelength-selective switch in order to be filtered separately.

According to another aspect of the present invention, the distribution of the signals within said at least two groups is carried out so as to produce a maximum spectral spacing between two successive channels within said at least two groups.

According to an additional aspect of the present invention, after filtering, the signals of said at least two groups are wavelength division multiplexed within an optical coupler.

According to an additional aspect of the present invention, a dynamic reception procedure is used in order to select a channel and detect it.

The invention also pertains to an optical signal transmission device comprising means configured to:
- determine the optimal spectral spacings between the various channels carrying optical signals intended to be transmitted as a function of the spectral width of said signals and the desired range present signals,
- establishing a special grid whose spectral spacings between two successive channels correspond to the previously determined spectral spacings,
- filtering said signals in order to adjust their spectral width as a function of the available spectral spacing and thereby to reduce crosstalk between adjacent channels when signals are transmitted.

According to another aspect of the present invention, the means configured to filter said signals comprise a wavelength-selective switch equipped with dynamic filters.

According to one additional aspect of the present invention, said device also comprises means configured to distribute the signals intended to be transmitted into at least two distinct groups, said two groups being sent to two distinct ports of the wavelength-selective switch so that they can be filtered separately.

According to another aspect of the present invention, said device further comprises means configured to multiplex the filtered signals corresponding to said at least two groups of signals.

The invention also pertains to an optical signal transmission device comprising means configured to:
- dynamically filter the received signals in order to select the spectral widths corresponding to the transmission channels in order to transmit the signal corresponding to a transmission channel to a receiver in order to enable the detection of said signal.

BREIF DESCRIPTION OF DRAWINGS

Other characteristics and benefits of the invention will become apparent from the following description, given with reference to the attached drawings, which by way of a non-limiting example depict one possible embodiment.

In these drawings.

DETAILED DESCRIPTION

In the following description, generally:

The term "crosstalk" corresponds to interference that occurs between spectrally adjacent signals when those signals are transmitted simultaneously, leading to a degradation in the signals.

The term "wavelength division multiplexing" corresponds to a method whereby different signals are transmitted on different distinct wavelength channels, said channels being multiplexed in order to be simultaneously transmitted over a shared optical fiber.

The term "source or source node" corresponds to the node of the network wherein an optical signal is emitted (generally by a laser) in order to be transmitted over the network to an egress node or egress by means of optical fibers.

The term "egress or egress node" corresponds to the node into which the optical signals emitted by a source node are intended to be converted into electrical or electronic signals in order to be transmitted to client servers.

The term "wavelength-selective switch" corresponds to a switch making it possible to select the signals received at one of its inputs based on wavelength, to route them to one of its outputs, and to multiplex them, if need be, to other signals switched to the same output.

The term "reconfigurable optical add drop multiplexer (ROADM)" corresponds to a multiplexer making it possible to add or drop one or more packets of a multiplexed optical packet flow.

The embodiments of the present invention correspond to the application of variable optical filtering corresponding to a variable spectral grid to signals intended to be multiplexed and transmitted over an optical fiber so as to reduce or avoid the spectral overlapping of the signals and thereby reduce the signal degradation suffered during the signal's propagation due to the effects of crosstalk.

Figure 1:
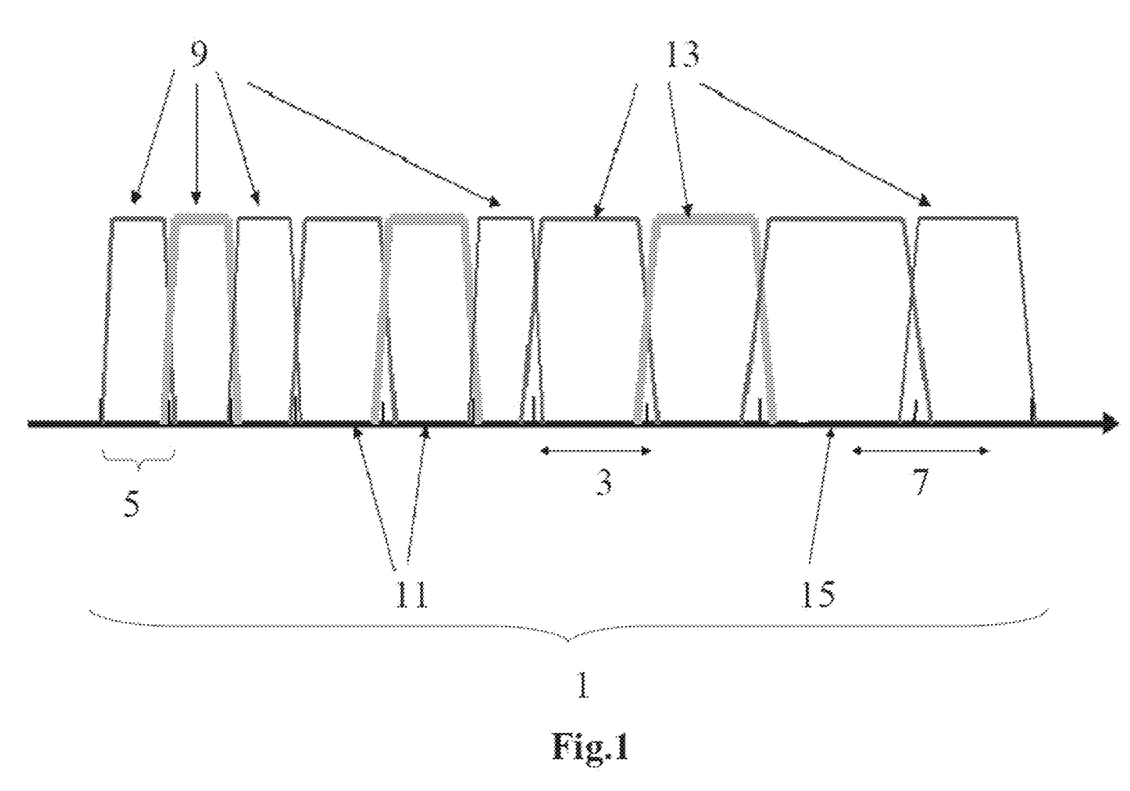
FIG. 1 depicts a diagram of an example variable spectral grid.

FIG. 1 depicts an example spectral grid 1 whose spectral interval 3 corresponding to a channel 5 (and consequently, the spectral spacing 7 between the channels) is variable. Thus, channels 5 having different spectral widths may be multiplexed, such as, for example, very narrow channels 9 with a spectral width of 25 GHz, narrow channels 11 with a spectral width of 33 GHz, medium channels 13 with a spectral width of 50 GHz, or wide channels 15 with a spectral width of 66 GHz, thereby enabling the transmission of signals with variable spectral width. Additionally, it should be noted that the scope of the embodiments of the present invention is not limited to the spectral widths mentioned above, but rather extends to any spectral width. Thus, the use of a variable spectral grid makes it possible to adapt the spectral intervals 3 of the channels 5 based on the characteristics of signals to be transmitted and thereby to transmit a greater quantity of signals and a greater capacity over the same spectral interval as compared to a fixed structural grid.

Figure 2:
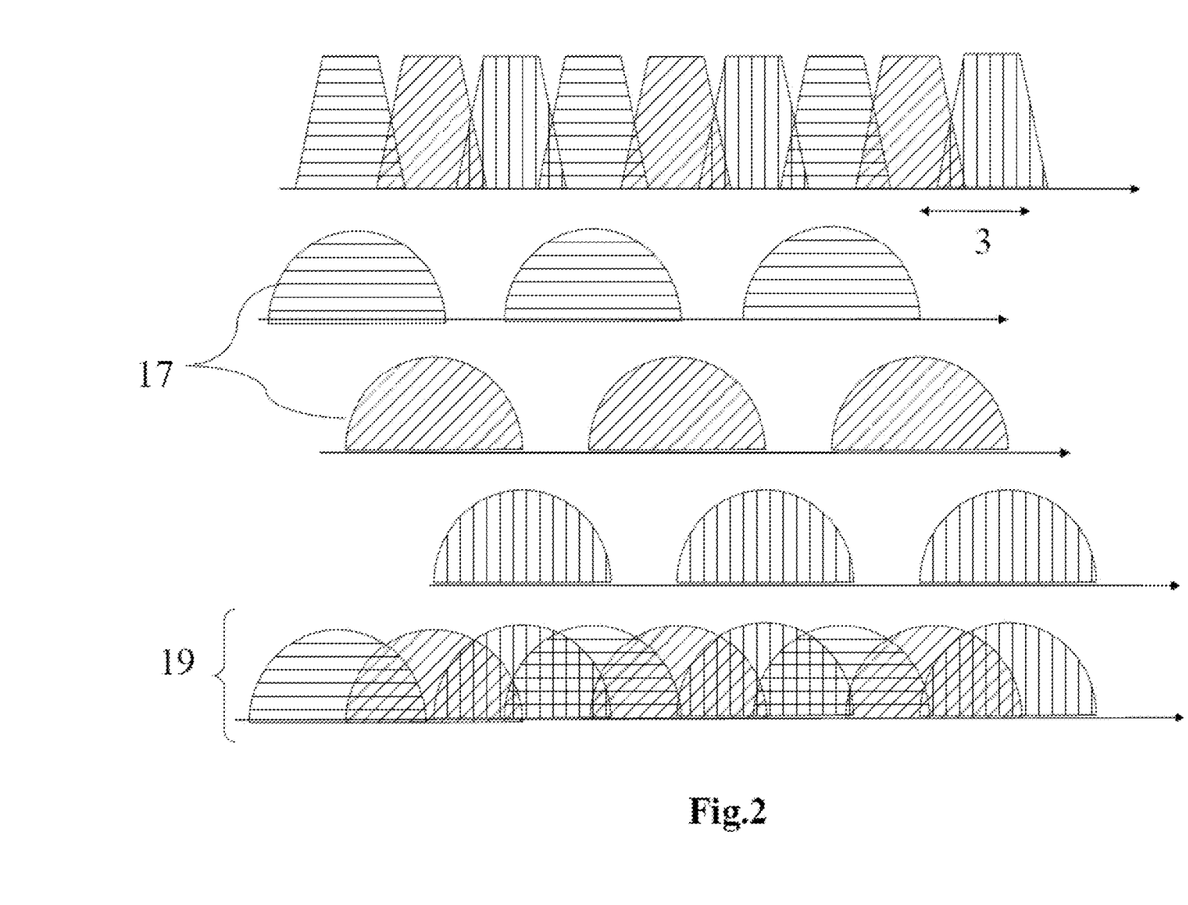
FIG. 2 depicts a diagram of signals overlapping when the spacing between the channels is reduced compared to the standards in use.

However, as depicted in FIG. 2, the spectral width of the signals 17 tends to exceed the spectral width 3 of the corresponding signal, causing a superimposition or overlap 19 of spectrally adjacent signals after multiplexing. As described above, this overlap leads to a phenomenon of crosstalk when the signals are propagated.

Thus, in order to overcome this problem, the embodiments of the present invention correspond to a filtering of signals so as to reduce their spectral width in order for that width to tend to be less than or equal to the spectral width 3 of the channel.

Figure 3:
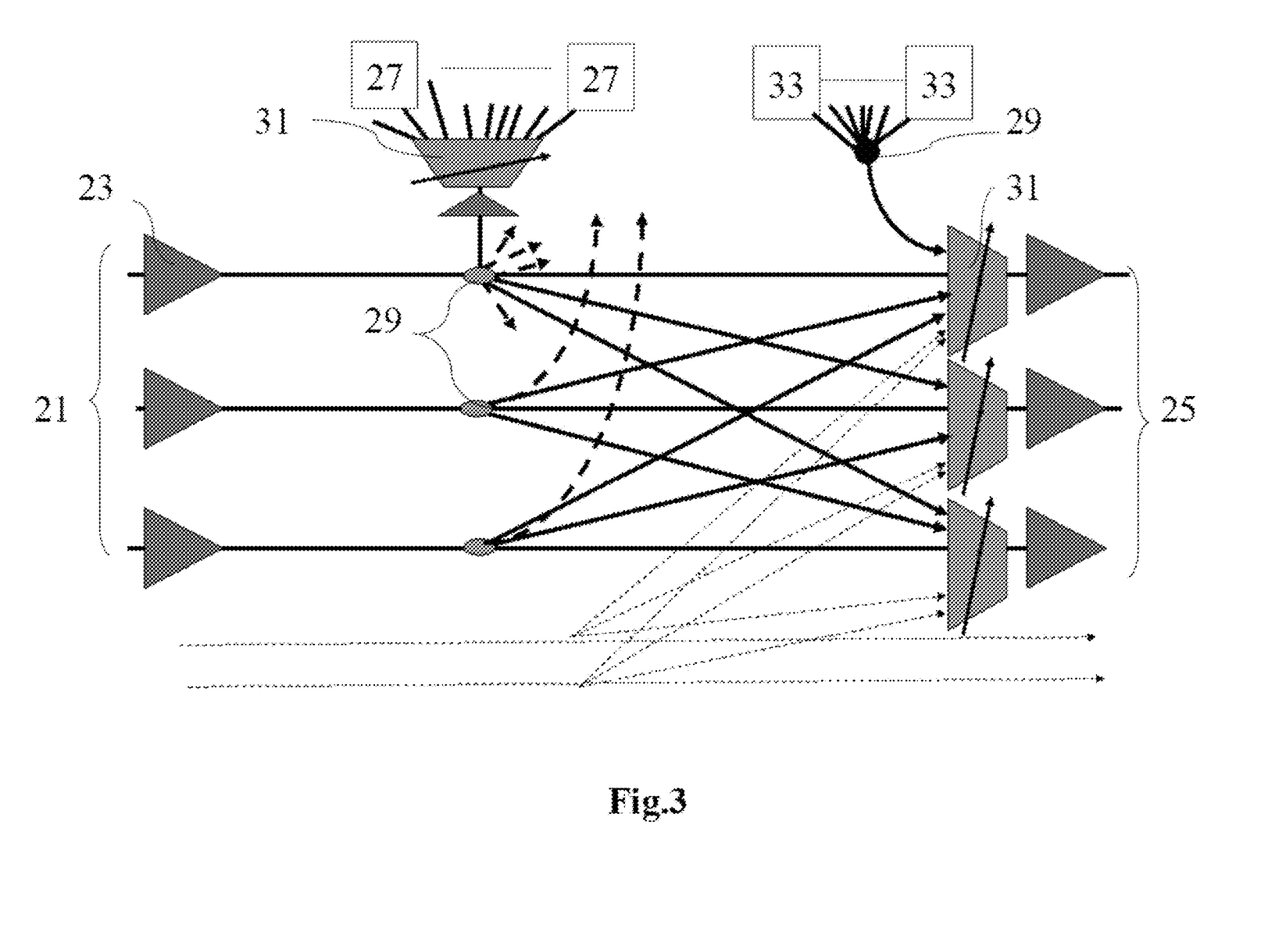
FIG. 3 depicts a diagram of one configuration of a reconfigurable optical add-drop multiplexer (ROADM) according to the state of the art.

FIG. 3 corresponds to a diagram of a reconfigurable optical add-drop multiplexer of the state of the art located within a node of the network. The signals received at the node's inputs 21 are amplified by optical amplifiers 23 and then transmitted to their destination, meeting to an output 25 of the node or to a receiver 27 of the node, by means of optical couplers 29 and wavelength-selective switches 31. When the signals are transmitted, the signals derived from the transmitters 33 are multiplexed within an optical coupler 29, then transmitted to a wavelength-selective switch 31 to be multiplexed with the signals received at the inputs 21 of the node and transparently transmitted to the same output 25 of the node.

Additionally, the wavelength-selective switches of the state of the art make it possible to apply filtering functions the signals. Nonetheless, in the configuration presented in FIG. 3, the signals derived from the transmitters 33 are multiplexed before being transmitted to the wavelength-selective switch 31 which makes it unnecessary to filter within the switch 31 because the signals already overlap before the input of the switch 31. Furthermore, adding dynamic filters within each transmitter would be a very expensive solution.

Figure 4:
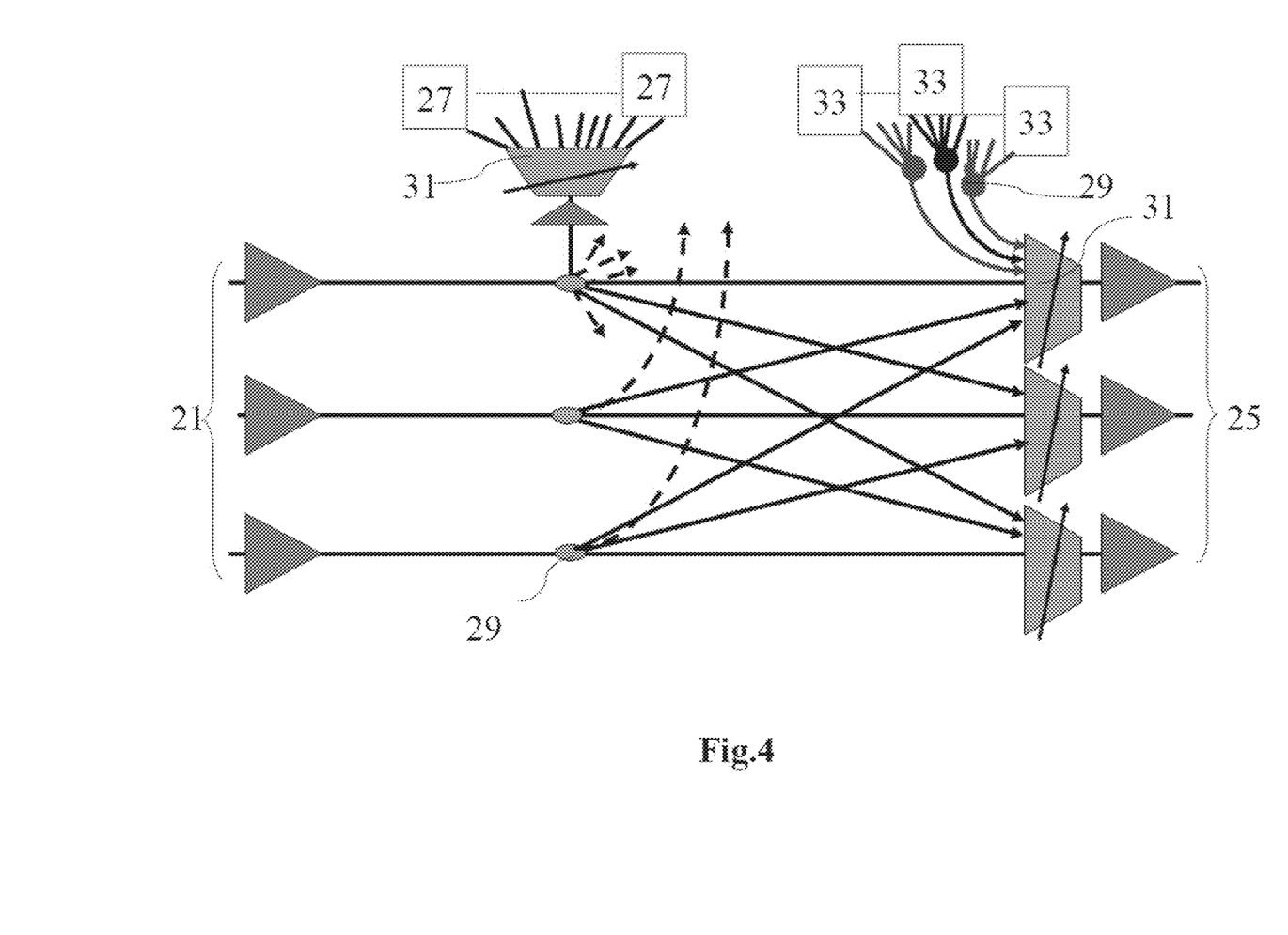
FIG. 4 depicts a diagram of a reconfigurable optical add-drop multiplexer according to one embodiment of the present invention.

FIG. 4 therefore describes a configuration according to the embodiments of the present invention wherein the signals derived from the transmitters 33 are distributed into at least two groups (three in this situation) and independently multiplexed by at least two optical couplers 29 (three, in FIG. 4's case), the outputs of the various optical couplers 29 being connected to distinct ports of the switch 31.

The signals derived from the transmitters 33 are then distributed among the various couplers so as to produce a maximum spectral spacing between two successive channels within the same group, so as to maximally reduce the overlap of the signals within a group. For example, in the case of two optical couplers 29, the even-numbered channels may be transmitted to the first optical coupler 29 while the odd-numbered channels may be transmitted to the second optical coupler.

Additionally, the more optical couplers 29 there are, the greater the spectral spacing between two successive signals will be, and the lower the risk of overlapping signals will be.

Figure 5:
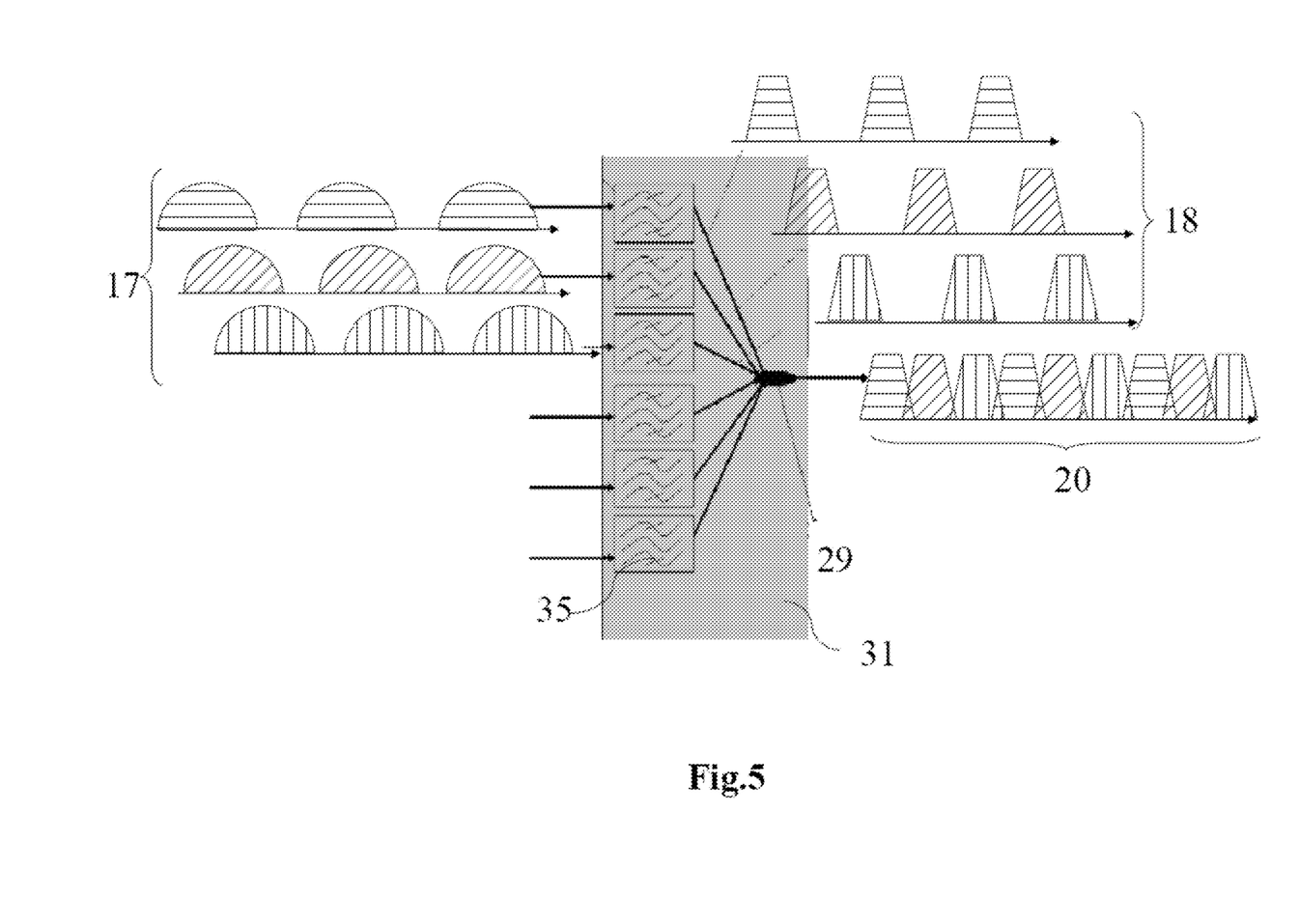
FIG. 5 depicts a diagram of an example of the dynamic filtering and multiplexing of signals filtered according to one embodiment of the present invention.

Thus, FIG. 5 describes the processing of signals within a wavelength-selective switch 31 according to one embodiment of the present invention corresponding to the configuration of FIG. 4. Thus, the signals derived from the transmitters 33 are distributed three groups and received at three distinct ports within the switch 31. Separating them into three groups makes it possible to keep the signals from overlapping 19 at the inputs of the switch 31 as previously depicted in FIG. 2.

Within the input ports of the switch 31, the received signals are transmitted to dynamic filters 35 that make it possible to reduce the spectral width of the signals so that this width corresponds to the spectral width of the transmission channels within the optical fiber. Once filtered, the obtained signals 18 may then be multiplexed within an optical coupler 29 of the switch 31. In this case, the overlapping obtained on the signals 20 is very weak, or even zero, which makes it possible to greatly decrease the phenomenon of crosstalk during transmission within the optical fiber.

Figure 6:
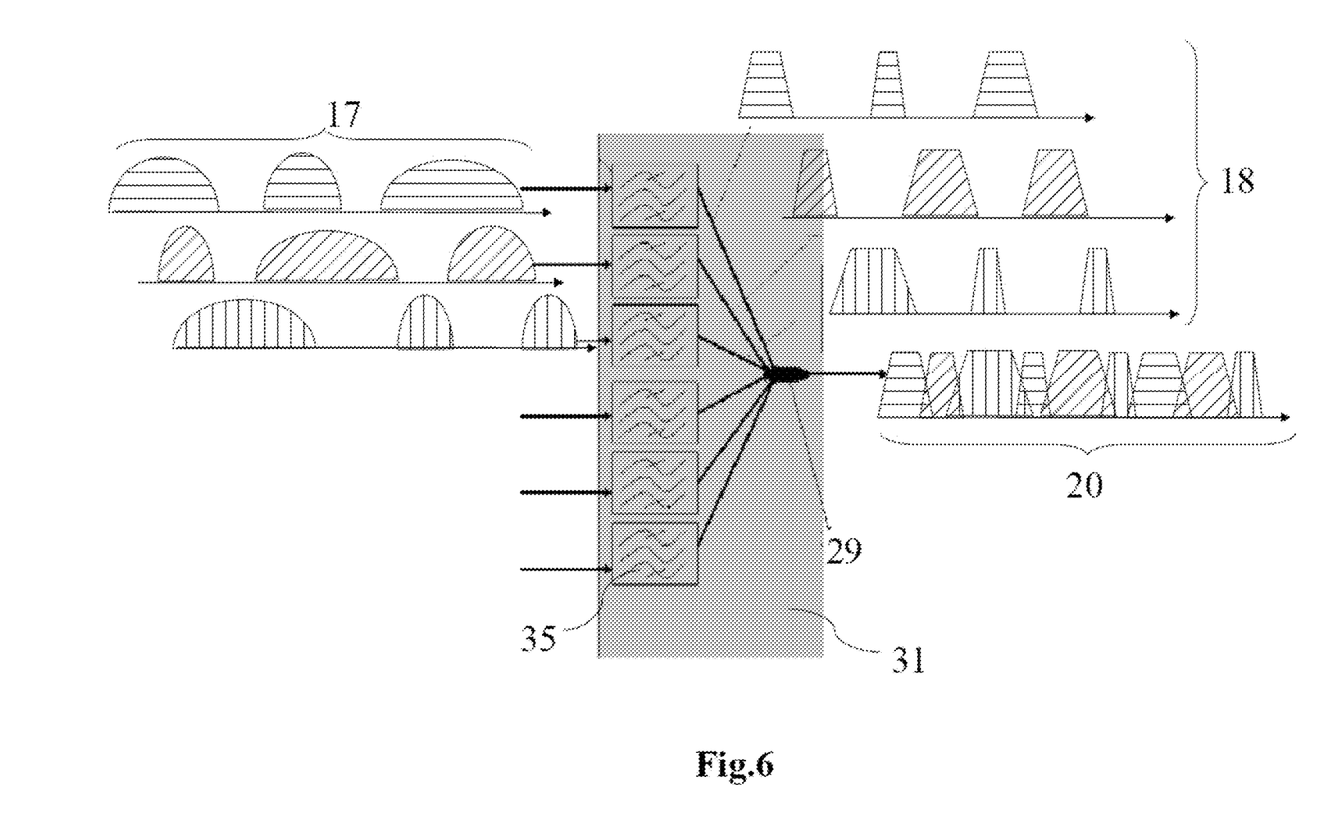
FIG. 6 depicts a diagram of an example of the dynamic filtering with a variable grid and multiplexing of signals filtered according to one embodiment of the present invention.

Furthermore, as described above, the invention applies to variable dynamic filtering as a function of the spectral grid as depicted in FIG. 6. Thus, the dynamic filters 35 of the switch 31 make it possible to adapt the spectral width of the signals as a function of the predetermined spectral grid so as to transmit variable spectral width signals within variable spectral width channels while maximally reducing the overlapping of spectrally adjacent signals.

Figure 7:
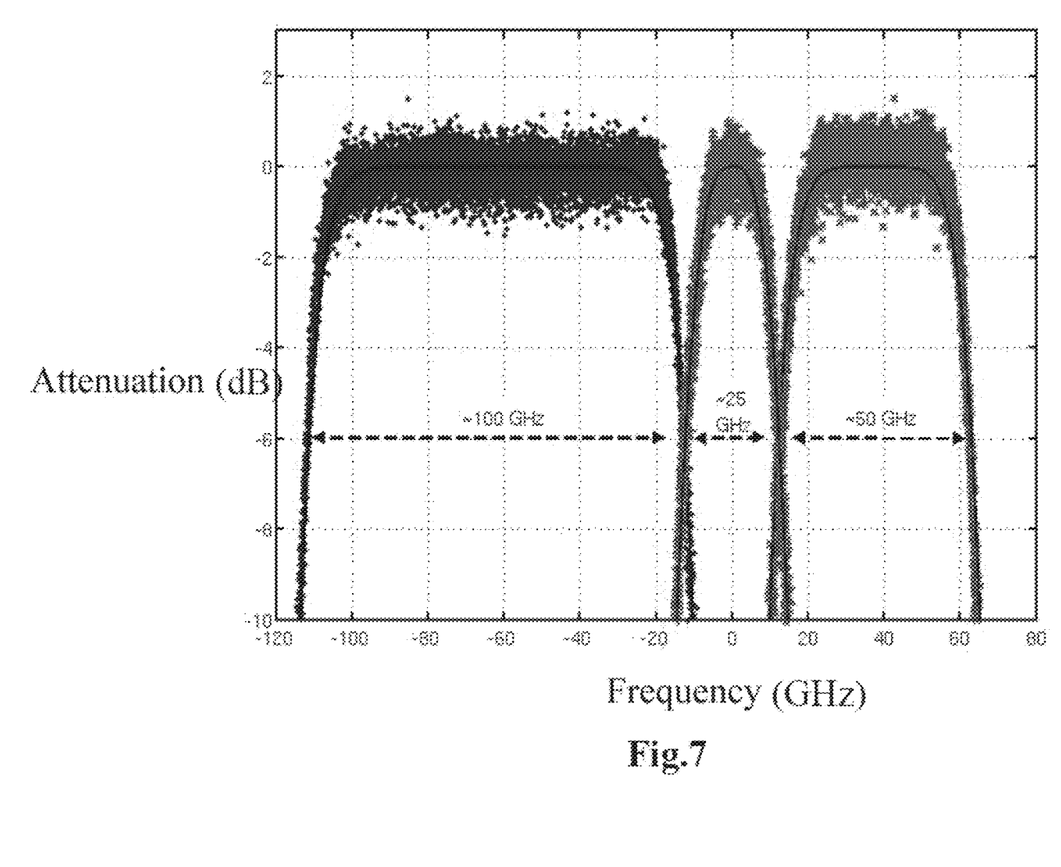
FIG. 7 depicts an example of filtering functions that apply to the optical signals in order to limit their spectral width.

FIG. 7 shows the filtering functions obtained by a dynamic filter for three different spectral widths (100 GHz, 25 GHz, and 50 GHz), these filtering functions being obtained by dynamic filters placed within wavelength-selective switches 31.

Figure 8:
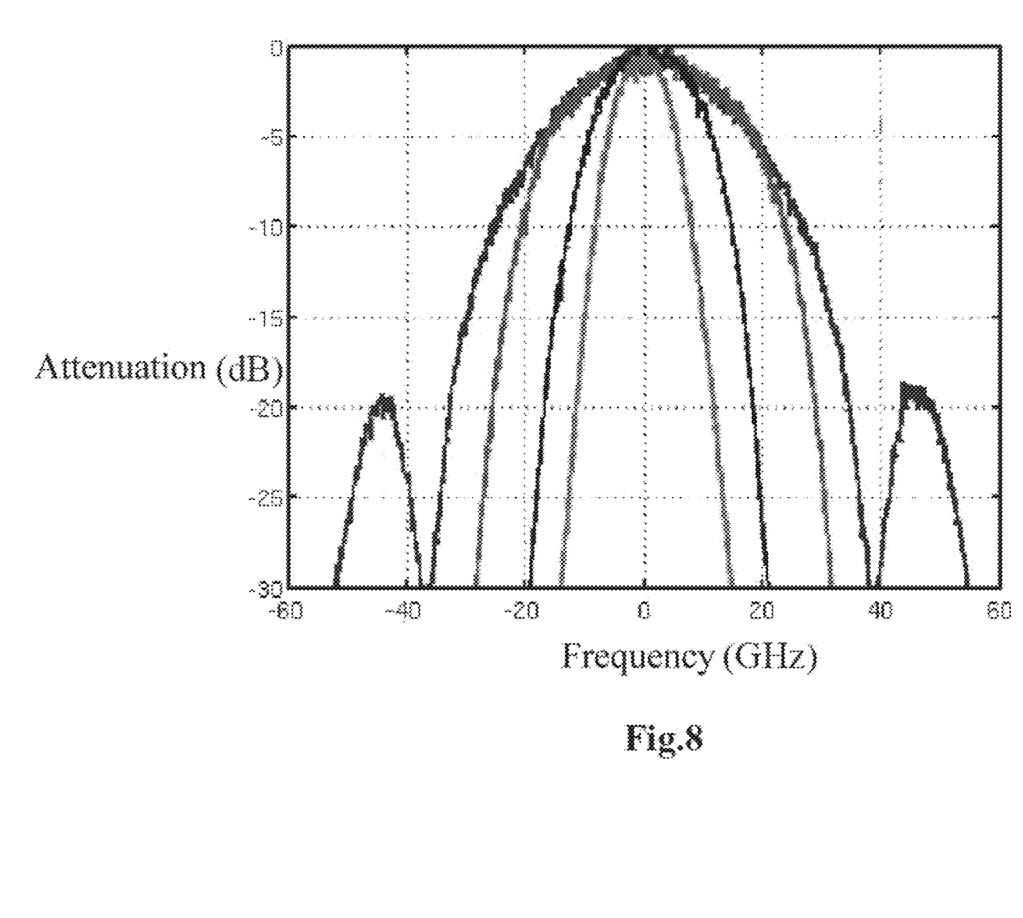
FIG. 8 depicts the effect of filtering functions as described in FIG. 6 in an optical signal.

Additionally, FIG. 8 describes the influence of various filtering functions on a starting signal of 100 GHz, thereby making it possible to decrease the signal's spectral width.

However, this filtering may have harmful consequences, because it tends to eliminate the signal's high frequencies, meaning that it lengthens the duration of the transition edges between the high levels and low levels of the transmitted signal. Thus, this filtering may lead to inter-symbol interference. Thus, a compromise must be found to enable a filtering of signals so as to reduce interference due to crosstalk, while limiting this filtering in order to avoid inter-symbol interference.

Figure 9:
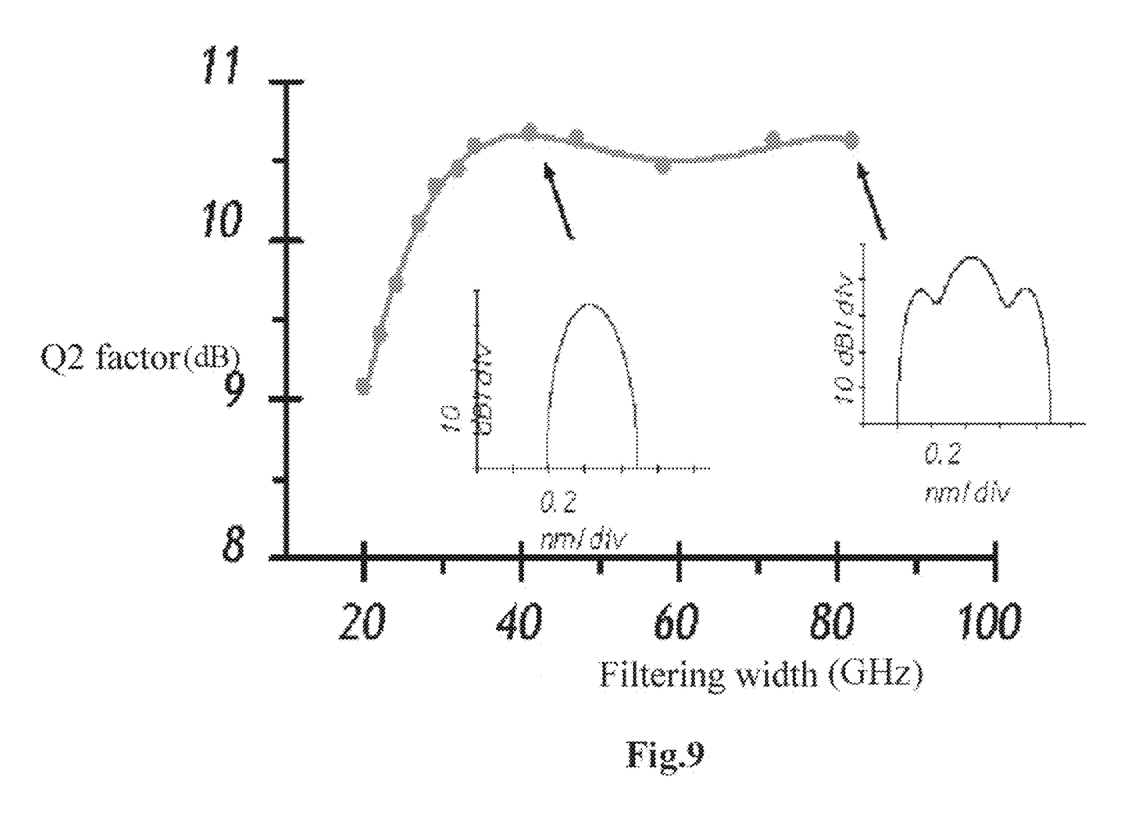
FIG. 9 depicts the quality of the end signal as a function of the filtering function applied within the source node.

Nonetheless, a moderate filtering makes it possible to reduce crosstalk while maintaining an acceptable signal quality within the egress node. This is because FIG. 9 depicts the quality of the signal (factor $Q^2$) measured for an original signal of 100 GHz after 2550 km of transmission onto which filtering functions having different spectral widths have been applied. The shapes of the transmitted signals are depicted for two spectral widths (80 GHz and 40 GHz). Thus, in FIG. 9, it is observed that there is almost no degradation in the quality of the end signal, up to a spectral width of 35 GHz, and only a moderate degradation for a spectral width of 30 GHz.

Thus, a moderate filtering of signals within the source node makes it possible to considerably reduce the phenomenon of cross-talk while preserving an acceptable end signal quality.

Furthermore, within the egress node, different methods may be used to detect signals transmitted using a variable spectral grid.

According to a first embodiment, a dynamic filtering makes it possible to select the spectral width of the selected channel, said spectral width being determined from the spectral grid used within the source node. Thus, the filtering of the channels may be done within a wavelength-selective switch 31, the signals corresponding to the various channels then being detected quadratically by quadratic receivers. In this case, the various channels are selected and transmitted to the various outputs of a switch 31 in order to be transmitted to the various receivers.

According to another embodiment, the detection of signals within the egress node is done coherently. In this situation, all of the signals of the spectral grid which are intended to be detected may be transmitted to a set of receivers. A local oscillator within each receiver makes it possible to select the wavelength corresponding to the channel whose signal must be detected. In this case, no dynamic filtering is necessary within the receiver, because the channel is selected by means of the local oscillator.

Thus, the embodiments of the present invention make it possible, owing to a filtering of the signals before they are multiplexed within the source node, to reduce the spectral overlap of the signals, and thereby to reduce the effects of crosstalk during the transmission of these signals over the network. Additionally, the separation of signals coming from a node's transmitters into multiple groups transmitted over various entities of a wavelength-selective switch in order to be able to apply filtering functions makes it possible to reduce this signal overlap while using existing equipment, i.e. for a reduced cost. Finally, the use of a variable spectral grid and signal filtering make it possible to reduce, particularly for signals which have a low transmission wavelength, the spectral width of the signals, and thereby to optimize the use of the available spectral band and therefore to increase the network's capacity while maintaining an acceptable end signal quality.

The invention claimed is:

1. An optical signal transmission device comprising means configured to:
    determine the optimal spectral spacings between the various channels carrying optical signals intended to be transmitted as a function of the spectral width of said signals and the desired range present signals,
    establishing a special grid whose spectral spacings between two successive channels correspond to the previously determined spectral spacings,
    filtering said signals in order to adjust their spectral width as a function of the available spectral spacing and thereby to reduce crosstalk between adjacent channels when signals are transmitted.

2. An optical signal transmission device according to claim 1, wherein the means configured to filter said signals comprise a wavelength-selective switch equipped with dynamic filters.

3. An optical signal transmission device according to claim 1 wherein said device also comprises means configured to distribute the signals intended to be transmitted into at least two distinct groups, said two groups being sent to two distinct ports of the wavelength-selective switch so that they can be filtered separately.

4. An optical signal transmission device according to claim 3 wherein said device comprises means configured to multiplex the filtered signals corresponding to said at least two groups of signals.

5. An optical signal transmission device according to claim 1, further comprising means configured to:
    dynamically filter received signals in order to select the spectral widths corresponding to the transmission channels in order to transmit the signal corresponding to a transmission channel to a receiver in order to enable the detection of said signal.

6. A method for optimizing capacity of an optical communication network that uses wavelength division multiplexing, comprising the step of:
    performing dynamic spectral distribution of signals to be transmitted over a plurality of channels through use of a variable spectral grid;
    determining spectral spacing between two successive channels of the variable spectral grid based on a spectral width of the signals; and
    dynamically filtering the signals before transmission to adjust the spectral width of the signals based on available spectral space to reduce crosstalk between adjacent channels when the signals are transmitted.

7. The method of claim 6, wherein the steps of determining spectral spacings and dynamically filtering applied to the signals are carried out with consideration for inter-symbol interferences introduced by dynamically filtering.

8. The method of claim 6, wherein the steps of determining the spectral spacings and dynamically filtering applied to the signals are carried out with consideration for a range desired for the signals.

9. The method of claim 6, wherein the step of dynamic filtering the signals is carried out within a wavelength-selective switch.

10. The method of claim 9, further comprising the step of:
distribution the signals intended to be transmitted into at least two groups, the at least two groups being sent to at least two distinct input ports of the wavelength-selective switch in order to be filtered separately.

11. The method of claim 10 wherein the step of distributing the signals is carried out so as to produce a maximum spectral spacing between two successive channels within the at least two groups.

12. The method of claim 10, further comprising the step of wavelength division multiplexing the signals of the at least two groups within an optical coupler after performing the step of dynamically filtering.

13. The method of claim 10 further comprising the step of using a dynamic reception procedure to select a channel and detect the channel.

\* \* \* \* \*